United States Patent [19]

Berstein et al.

[11] Patent Number: 4,895,057

[45] Date of Patent: Jan. 23, 1990

[54] MACHINE TOOL FOR BROACHING CRANKSHAFT CONNECTING ROD BEARINGS

[75] Inventors: Garri Berstein, Erkelenz; Hans W. Obrig, Essen; Helmut Wittkopp, Erkelenz; Hermann Wolters, Moenchengladbach, all of Fed. Rep. of Germany

[73] Assignee: Wilhelm Hegenscheidt Gesellschaft mbH, Erkelenz, Fed. Rep. of Germany

[21] Appl. No.: 109,934

[22] Filed: Oct. 16, 1987

[30] Foreign Application Priority Data

Oct. 22, 1986 [EP] European Pat. Off. ............ 86114633

[51] Int. Cl.⁴ .............................................. B23B 5/18
[52] U.S. Cl. ......................................... 83/106; 82/165
[58] Field of Search ...................... 82/8, 9, 40 R, 40 A

[56] References Cited

U.S. PATENT DOCUMENTS

| Re. 19,730 | 8/1935 | Groene | 82/40 A |
|---|---|---|---|
| 2,511,741 | 6/1950 | Schulz | 82/40 A |
| 2,570,964 | 8/1951 | Meyer | 82/40 A |
| 2,604,804 | 7/1952 | Schulz | 82/40 A |
| 2,620,699 | 12/1952 | Meyer | 82/40 A |
| 3,257,880 | 6/1966 | Hermann | 82/40 A |
| 3,680,876 | 8/1972 | Okada | 82/40 A |
| 3,880,025 | 4/1975 | Kralowetz et al. | 82/9 |
| 4,521,143 | 6/1985 | Schmid | 82/9 |
| 4,693,147 | 9/1987 | Shackleton | 82/8 |

FOREIGN PATENT DOCUMENTS 2856037 7/1980 Fed. Rep. of Germany ..... 82/40 A
2306769 11/1976 France .

OTHER PUBLICATIONS

P. 28 of "Maschinenmarkt", Wuerzburg 92 (1986) 34 (Article).

Primary Examiner—Frederick R. Schmidt
Assistant Examiner—Lawrence Cruz
Attorney, Agent, or Firm—W. G. Fasse; D. H. Kane, Jr.

[57] ABSTRACT

The known turn broaching of crankshaft main bearings is not suitable for broaching crankshaft bearing pins for the connecting rods because that would require locating the rotational axis of the crankshaft in the connecting rod bearing pins, whereby the crankshaft would rotate eccentrically. The resulting unbalances prevent driving the crankshaft with the r.p.m. required for the turn broaching operation. To avoid this problem a broaching lathe for the rotational or turn broaching of crankshaft connecting rod bearing pins is equipped with a steady rest including a rotating support device which permits mounting the crankshaft in the lathe in such a way that the rotational axis coincides with the axis of the connecting rod bearings of the crankshaft.

8 Claims, 7 Drawing Sheets

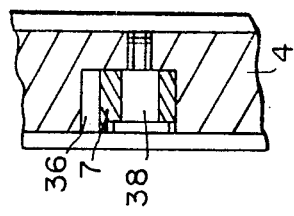
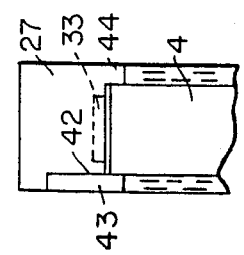
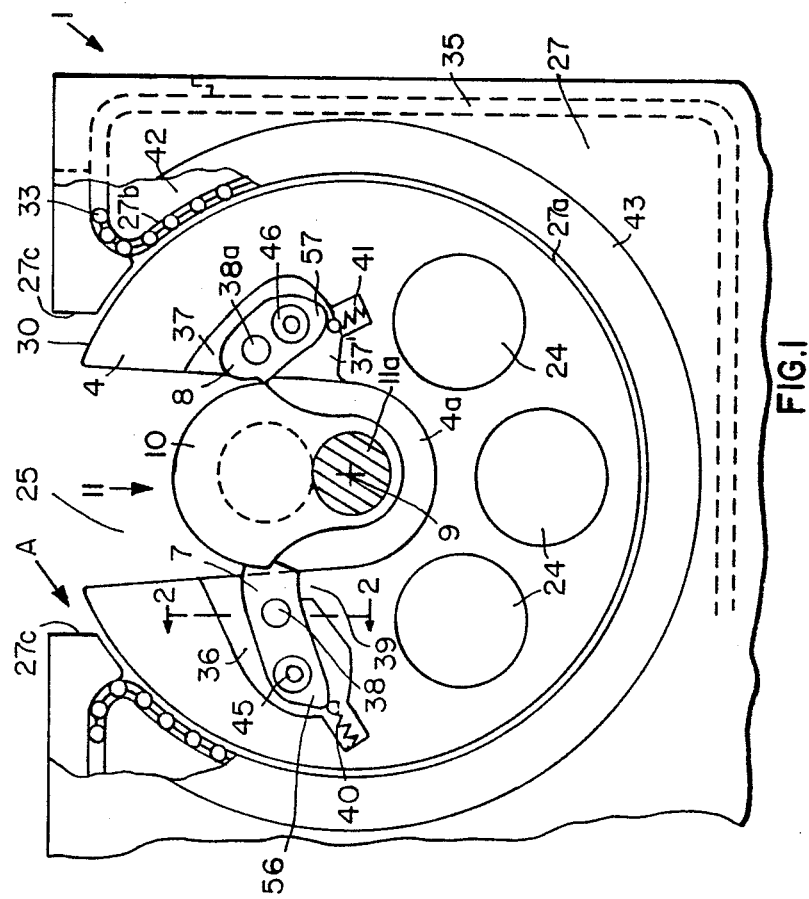

MACHINE TOOL FOR BROACHING CRANKSHAFT CONNECTING ROD BEARINGS

FIELD OF THE INVENTION

The invention relates to a machine tool, more specifically, a lathe type machine tool for broaching crankshaft connecting rod bearings in a turning manner. The present machine can handle multi-stroke crankshafts.

DESCRIPTION OF THE PRIOR ART

Machines for performing a turning broaching operation on the main bearings of crankshafts are known in the art. Such machines include means for mounting and rotationally driving a crankshaft about its main rotational axis for cooperation with a rotational or turning broaching tool which can be brought into contact with the main bearings of the multi-stroke crankshaft. Such machines also comprise conventional machine tool controls.

The machining of work pieces which are sensitive to bending loads or to vibrations or oscillations, causes substantial difficulties, for example, in connection with crankshafts which are to be machined by a turning broaching operation. These difficulties are due to the fact that the broaching tools apply a substantial radial force and also a substantial tangential force to the work piece during the machining operation, whereby the work piece is deflected. This problem is especially pronounced when a lathe type machining is necessary on crankshafts of substantial length. This problem has been treated in an article entitled "Compensating the Machining Forces", which appeared in the trade magazine "Maschinemarkt" (1986), No. 34, page 23, see especially FIG. 8 in the middle column and the respective text in the right-hand column. FIG. 8 shows the machining of a crankshaft by so-called rotational turn broaching tools which are symmetrically distributed circumferentially around the crankshaft pins to be machined. All three tools machine this one crankshaft pin simultaneously. The respective text in said article mentions that the limits of that method are to be seen where, due to the bending of the work piece in response to the machining force and in response to the mass required, tolerances can no longer be maintained or assured.

Steps to keep these limits as wide as possible, may be taken on the work piece side as well as on the machine side. FIG. 8 of the above article shows an arrangement in which the total number of cutting tool edges is distributed onto three segments. By suitably arranging the individual segments or turn plates on the respective base bodies it is possible to compensate in an apparatus as shown in FIG. 8 of said article, the resulting machining force and the mass forces effective on the crankshaft. The machine shown in FIG. 8 of said article makes it possible to machine even unstable work pieces in which a turn broaching was not possible prior to said article.

The above described method and apparatus can be used only in connection with crankshafts that are relatively well balanced and for machining the crankshaft main bearing pin. Even under these conditions it is possible to machine only crankshafts that are relatively short. When longer crankshafts are to be machined, it has been found that imbalances cause mass forces which in turn cause oscillations or variations in the machining and these oscillations or variations rotate with the crankshaft. In cases where a substantial unbalance is present in the crankshaft, it is not possible to use the above mentioned method due to the extremely large unbalance forces. This situation is always present when the rotational axis of the crank shaft passes not through the main bearing pin, but through the connecting rod bearing pins. Even in connection with relatively short crankshafts it is not possible to use the above method when the rotational axis is supposed to pass through the connecting rod bearing pins. Even in the presence of the several tools arranged around the crankshaft bearing pin, the r.p.m. required for the broaching machining would result in such a pronounced bending of the crankshaft that a proper machining is no longer possible. Thus, the turn broaching of connecting rod bearing pins of crankshafts is unknown in the prior art.

OBJECTS OF THE INVENTION

In view of the foregoing it is the aim of the invention to achieve the following objects singly or in combination:

to construct a lathe type machine tool for performing a turn broaching operation on unstable work pieces, especially crankshafts;

to prevent an unpermissible bending of a crankshaft when it is being turn broached, even if substantial unbalance forces are involved;

to construct a broaching tool as an independent structural unit which may even be incorporated in existing machine tools suitable for a turn broaching operation of main bearings to thereby extend the capability to the turn broaching of connecting rod bearing pins; and to construct the rotatable support means in such a way that a centrifugal force even enhances or increases the supporting force provided by the rotatable support means.

SUMMARY OF THE INVENTION

A machine tool for turn broaching crankshaft connecting rod bearing pins according to the invention is equipped with at least one steady rest including rotatable support means for safely supporting a crankshaft when it is rotating in an eccentric manner, in other words, when its rotating axis extends through the connecting rod crankshaft bearing pins rather than through the main crankshaft bearing pins. The steady rest with its rotatable support means is capable of taking up the unbalance forces, whereby the rotatable support means rotate about the rotational axis. Thus, in spite of substantial unbalanced forces, it is possible to prevent unpermissible bending of the crankshaft during the machining operation. The steady rest means are incorporated in a turn broaching machine which otherwise is capable only of turn broaching the main crankshaft bearing pins. The crankshaft is taken up, however, in such a way that it may be driven to rotate about its connecting rod bearing pins rather than about its main bearing pins. In such an arrangement the rotatable support means may be either entrained by the driven crankshaft or a separate drive means may be provided for the rotatable support means.

Advantages of the invention are seen in that unbalance forces may be taken up exactly where they occur, namely at the eccentrically rotating parts of a work piece, such as a crankshaft. Providing the rotatable support means with its own positive drive avoids any problems that might be caused by an entraining of the rotatable support means, especially in connection with very long crankshafts involving large mass forces of the rotatable or rotating support means that may possibly cause torsional oscillations in the crankshaft during the machining. The invention avoids this problem. By making the support elements of the rotatable support means adjustable in position it is possible to adapt the present broaching tool to crankshafts of differing length. By balancing the steady rest it is possible to keep radial loads as small as possible.

Further advantages are seen in that the present apparatus can be constructed as an independent attachment, even for existing turn broaching machines, and the attachment can be equipped with an opening for the insertion and removal of work pieces in a radial direction. By guiding the rotatable support means along its circumferential surface by means of rolling contact bodies, radial forces can be taken up with a minimum of friction although such rolling contact bodies such as rollers, can take up substantial radial forces.

By arranging the support elements of the rotatable support means in a movable manner on the rotating support means, advantage can be taken of the centrifugal forces to enhance the support forces. This feature also facilitates the work piece exchange since the support elements are easily moved. Additionally, the support force applied to the work piece depends directly on the r.p.m. so that the support force is even improved as the r.p.m. increases and even as the forces caused by the unbalance are increased by an increasing r.p.m.

BRIEF DESCRIPTION OF THE DRAWINGS

In order that the invention may be clearly understood, it will now be described, by way of example, with reference to the accompanying drawings, wherein:

FIG. 1 is a partial side view of a steady rest according to the invention, whereby the support means are shown partially broken away;

FIG. 2 is a sectional view along section line 2—2 in FIG. 1;

FIG. 3 is a view in the direction of the arrow A in FIG. 1;

Figure 4:
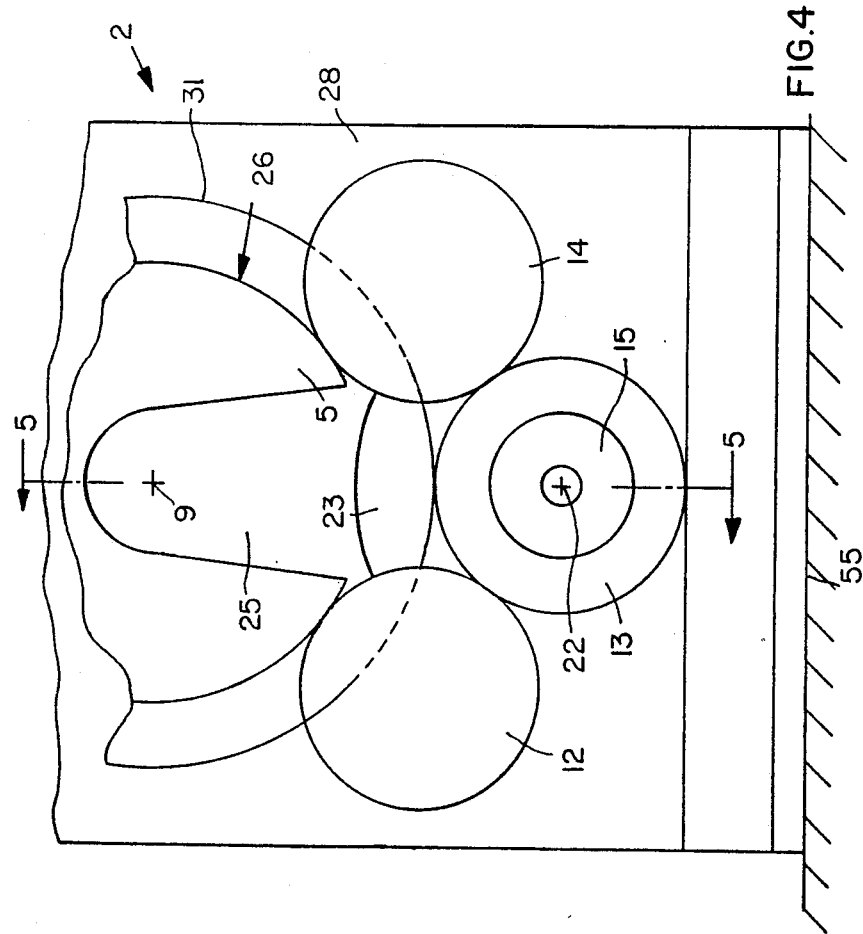
FIG. 4 is a view similar to that of FIG. 1, but showing a modified embodiment of a steady rest according to the invention in which the support means are positively driven.

DETAILED DESCRIPTION OF PREFERRED EXAMPLE EMBODIMENTS AND OF THE BEST MODE OF THE INVENTION

Referring to FIG. 1, a so-called steady rest 1 is supported in a steady rest mount 27 shown partially broken away. The steady rest 1 includes a rotatable support device 4 which supports the steady rest head which is relevant for the present invention. The remaining construction of the steady rest mount 27 is such, that the steady rest mount 27 can be secured to the machine bed of a machine tool, shown in FIGS. 8 and 9 suitable for so-called turn broaching operation. If required, the steady rest mount 27 may itself be mounted on a slide which in turn rests on a slide bed of the turn broaching machine. In such a structure, the steady rest mount 27 may be displaced back and forth with its bed slide in the direction of the rotational axes 9 extending perpendicularly to the plane of FIG. 1. In such an embodiment the steady rest mount 27 may itself be constructed as a bed slide.

The head section of the steady rest mount 27 supports the steady rest 1 in a rotatable manner to be described in more detail below. The steady rest mount 27 has a large bore 27a in which the rotatable support means 4 is rotatably supported. The support means 4 comprise a disk with a circumferential surface 30 received in the bore 27a so that the support means 4 are radially guided and rotatable inside the steady rest mount 27. For this purpose the bore 27a is surrounded by a channel 27b which receives rolling contact bodies 33 held in place by a cover 43 received in a recess 42 of the steady rest mount 27. Thus, the support disk 4 is rotatably supported by the rolling contact bodies 33 which do not surround the disk 4 entirely. It has been found to be satisfactory if the roller bodies encircle about 300° of the disk 4. Thus, these roller bodies which are conventionally interconnected to form an endless chain, are guided for a return movement so to speak in a channel 35 in the steady rest mount 27. The steady rest mount 27 has an upwardly facing opening 27c which is free of the rotatable bodies 33 and provides access for a work piece exchange. This opening 27c merges into the bore 27a in which the support disk 4 is rotatably mounted.

The support disk 4 also has a radial opening 25 having a lower end 4a extending concentrically around the rotational axis 9. In the tool exchange condition the opening 25 faces upwardly or in any other direction convenient for the tool exchange. In any event, the opening 25 with its lower end 4a is so dimensioned that it provides sufficient space for a work piece, for example, a crankshaft 11 to be received in the opening 25 for a turn broaching operation. Thus, the crankshaft 11 having a connecting rod bearing or crank pin 11a and eccentric components 10 such as the cheeks of the crankshaft 11, is received in the opening 25 in such a way that the connecting rod bearing or crank pin 11a is located coincident with the rotational axis 9 of the turn broaching machine tool shown in FIGS. 8 and 9. In order to balance the mass that is removed due to the opening 25, the support disk 4 is provided with holes 24. A balancing operation may be made by determining the number and size of holes 24 or by inserting a weight in one or several of the holes 24.

Figure 8:
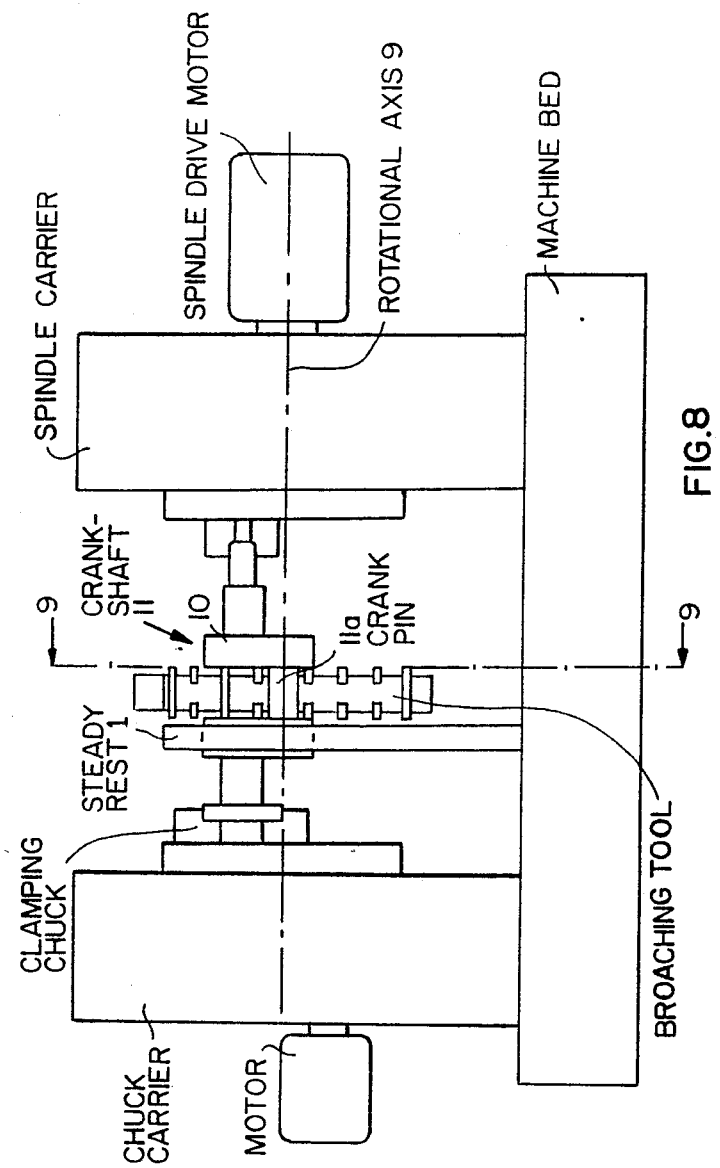
FIG. 8 is a schematic front view of a turn broaching machine tool according to the invention.
Figure 9:
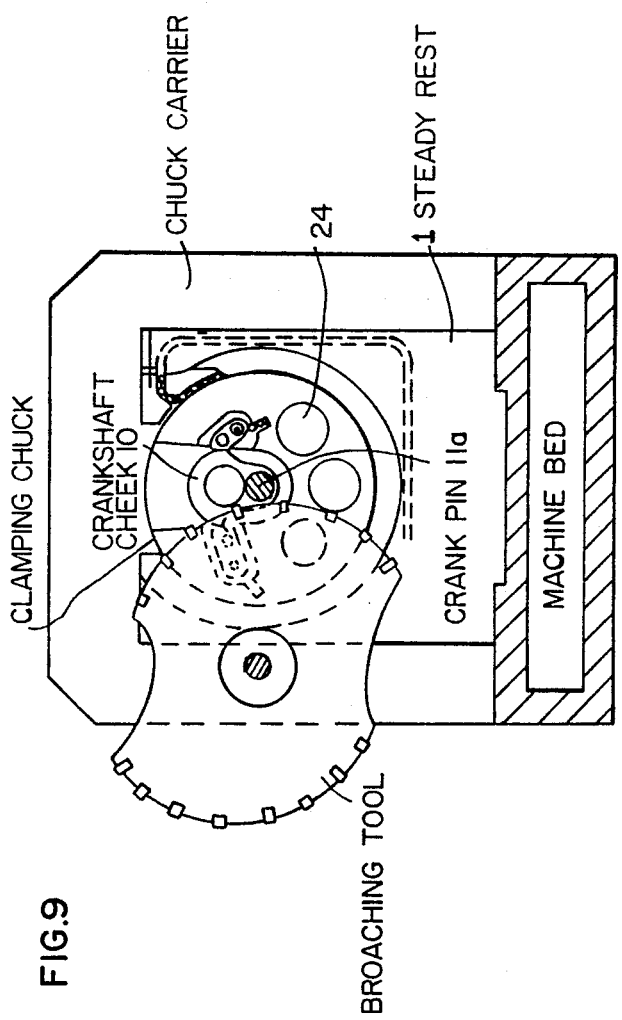
FIG. 9 is a view in the direction of the arrows indicating a section plane 9—9 in FIG. 8.

As shown in FIG. 1, the work piece in the form of the crankshaft 11 is arranged in the opening 25 of the rotatable work piece support disk 4 and is held in the illustrated position by the work piece mounting steady rest mount 27 of the turn broaching machine which is shown in FIG. 8. The work piece mounting means hold the crankshaft 11 so that the rotational axis 9 of the turn broaching machine coincides with the crank pins or connecting rod bearing pins of the crankshaft 11, whereby the turn broaching machine also rotates the crankshaft 11 about said rotational axis 9 of said crank pins. The rotational axis 9 of the crank pins 11a is the rotational axis of the support disk 4.

According to the invention the support disk 4 is provided with recesses 36 and 37 facing each other across the opening 25. The recesses do not extend entirely through the support disk 4. Work piece holding elements 7 and 8 are tiltably mounted in these recesses 36, 37 respectively. Thus, the holding elements function as two armed rocker levers, whereby the holding element 7 is tiltably supported by a bearing bolt 38 extending in parallel to the rotational axis 9 and perpendicularly to the central plane of the support disk 4. The holding element 8 is similarly tiltably mounted on a bolt 38a. Each holder 7, 8 has a work piece contacting surface at its free end reaching into the opening 25 for contacting a respective surface on the work piece. Such contact surfaces are either present on the crankshaft or can be easily provided on the crankshaft prior to insertion into the present broaching tool. Such contact surfaces are also required for the further machining of the crankshaft. As shown in FIG. 1, the holders 7 and 8 contact the eccentric component 10 of the crankshaft 11. The contact surfaces on the crankshaft may be the crank webs or the main crank bearing pins or any other suitable location. The recess 36 is provided with an anvil 39 on which a lower edge of the holder 7 rests when the holder 7 contacts the work piece. Contrary thereto, the recess 37 has a lower extension 37' in which the holder 8 is not supported. This feature makes sure that the support of the work piece 11 is statically determined. In other words, a static over-determination is avoided.

The arm of each work piece holding element 7, 8 extending away from the opening 25 has a cam 56 in the case of the holder 7 and a cam 57 in the case of the holder 8. These cams cooperate with spring biased stops 40, 41 respectively that can be over-ridden as will be described in more detail below. If the work piece 11 is properly inserted as shown in FIG. 1, the spring biased stops 40, 41 make sure that the holders 7 and 8 are tilted with the respective force that tends to pull the work piece into the opening 25. However, the holder 7 comes to rest on the anvil 39 so that a further inwardly directed force on the work piece 11 by the holder 7 is not possible. On the other hand, the holder 8 does not rest against a respective stop, but the force exerted by the holder 8 is so directed that its resultant extends between the axis of the bearing bolt 38 of the holder 7 and the rotational axis 9, thereby preventing any noticeable deformation of the work piece 11. The direction of the force exerted by the holder 8 is most advantageous when it passes through the bearing bolt 38 or if it has a direction passing close to the bearing bolt 38.

When the support disk 4 rotates because it is entrained by the positive rotation of the work piece 11, a centrifugal force component is effective on the holders 7 and 8 in such a way that these holders tend to pull the crankshaft 11 radially inwardly into the opening 25. On the other hand, the unbalanced eccentric component 10 of the crankshaft 11 causes an oppositely radially outwardly directed force component, whereby the entire mounting of the work piece can be so constructed that the mentioned forces compensate each other or that the forces caused by the holders 7 and 8 on the crankshaft 11 are slightly larger than the forces caused by the eccentric component 10. The control of the radially inwardly directed holding force component exerted by the holders 7 and 8 is accomplished with the aid of weight elements 45, 46 secured to the arms of the holders 7, 8 directed away from the opening 25. Thus, the weight 45, under the influence of the centrifugal force, tends to rotate the holder 7 clockwise about its bearing bolt 38 while the weight 46, under the influence of the centrifugal force, tends to turn the holder 8 counterclockwise about its bearing bolt 38a. By selecting these weights 45, 46 properly, it is possible to assure that the forces tending to hold the work piece 11 radially inwardly exceed the forces caused by the eccentric component 10 so that the crankshaft 11 is safely held in place even if large imbalances are involved. Thus, the just described features according to the invention make it possible to turn broach the connecting rod bearing pins of a crankshaft which has not been possible heretofore.

Referring to FIG. 3, the cover 43 extends radially inwardly sufficiently to hold the rotatable support disk 4 against an axial displacement. Similarly, the steady rest mount 27 has a radially inwardly extending collar 44 which holds the support disk 4 in the opposite axial direction. Thus, the disk 4 can rotate between the cover 43 and the collar 44 but it cannot move axially.

Figure 5:
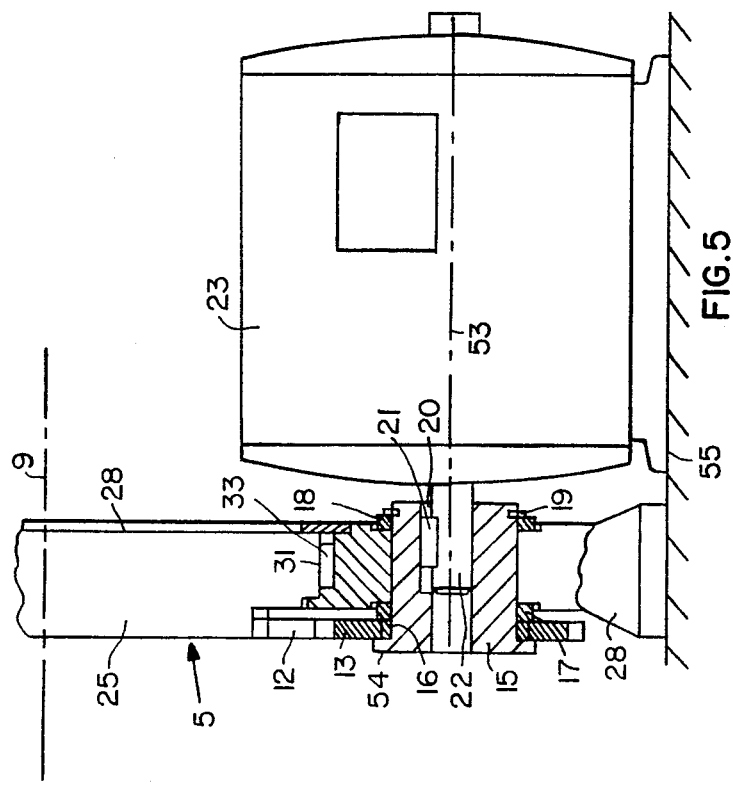
FIG. 5 is a sectional view along section line 5—5 in FIG. 4 and further showing the motor for positively driving the steady rest support means.

FIGS. 4 and 5 show a modified embodiment of the invention in which the steady rest 2 has a support disk 5 again provided with a radially extending opening 25 and supported by rolling contact bodies 33 on a circumferential surface 31, similar to FIG. 1. Rather, the support disk 5 is itself in positive driving contact with gear wheels 12 and 14. For this purpose, the support disk 5 has a gear rim 26. The gear wheels 12 and 14 are mounted in a steady rest mount 28 which supports the disk 5 in a rotatable manner by the said rolling contact bodies 33. The two gear wheels 12 and 14 have the same diameter and cannot be displaced in an axial direction in the steady rest mount 28. The horizontal spacing of the gear wheels 12 and 14 and their diameter is such that at least one of these gear wheels will support the disk 5 outside the opening 25, whereby that one gear wheel 12 or 14 will remain in contact with the gear rim 26. Both gear wheels 12 and 14 mesh simultaneously with a drive pinion 13 driven by a motor 23 shown in FIG. 5. Thus, both gear wheels 12 and 14 always have the same rotational speed. Accordingly, even if one of the wheels 12 or 14 passes the opening 25, the disk 5 will continue to be rotated at a uniform speed. Accordingly, the meshing of both wheels 12 and 14 with the disk 5 will not be disturbed due to the radially directed opening 25. Referring to FIG. 5, the motor 23 has a shaft 22 rigidly connected to a drive bushing 15 through a tongue 21 reaching into a groove 20 of the bushing 15. Thus, the bushing 15 rotates with the shaft 22. The drive gear wheel 13 is also rigidly secured to the bushing 15 through a tongue and groove device 16. Thus, the bushing 15 transmits the rotation of the shaft 22 to the gear wheel 13 meshing with the gear wheels 12 and 14. The bushing 15 is rotatably supported in a bore of the steady rest mount 28, whereby sleeve bearing type rings 17 and 18 facilitate the rotation of the bushing 15 relative to the steady rest mount 28 and whereby a spring ring 19 cooperates with a collar 54 of the bushing 15 to hold the bushing 15 axially in place. The bushing has a rotational axis 53 extending in parallel to the rotational axis 9 and coinciding with the rotational axis of the drive shaft 22. Incidentally, the gear wheels 12, 13, and 14 are shown as circles for simplicity's sake.

The motor 23 and the steady rest mount 28 may be supported on a common machine bed or frame 55. The bed or frame 55 may actually be the surface of a slide which in turn rests movably on a machine bed. This feature makes it possible to displace the entire unit with the motor 23 and the steady rest mount 28 back and forth in the direction of the axis 9, thereby accommodating different support positions along a crankshaft or to accommodate crankshafts of different length.

Figure 6:
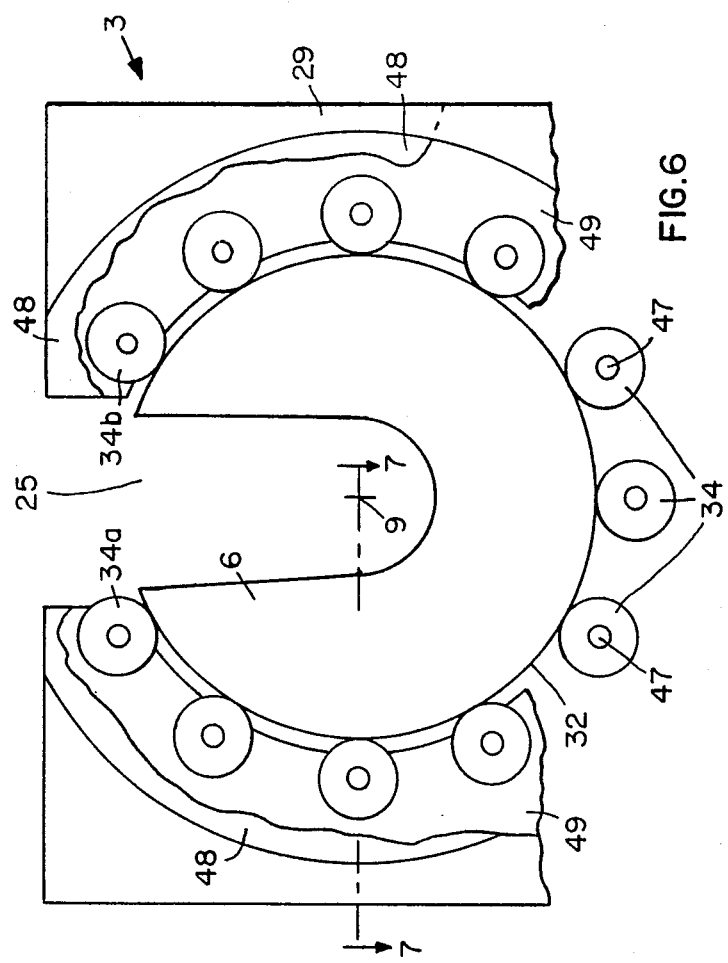
FIG. 6 is a steady rest similar to that shown in FIG. 1 or FIG. 4, however showing fixed rollers for carrying the rotatable steady rest support means.
Figure 7:
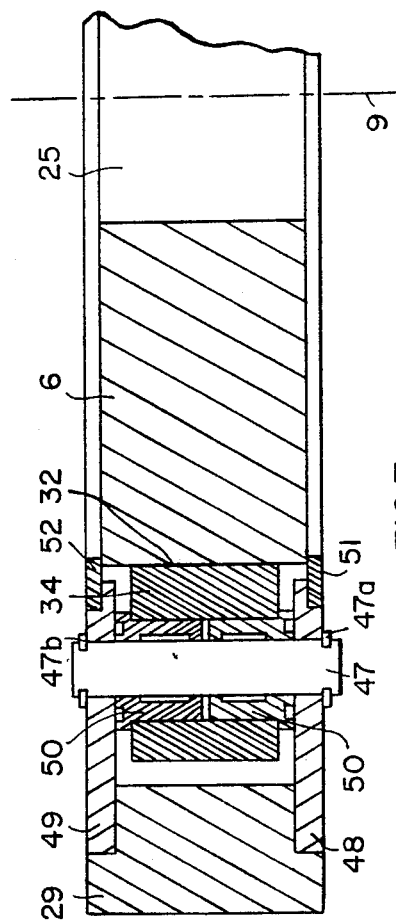
FIG. 7 is a sectional view along section line 7—7 in FIG. 6.

FIGS. 6 and 7 show an embodiment which is quite similar to that of FIG. 1. However, in the embodiment of FIGS. 6 and 7, the rolling contact bodies 33 have been replaced by individual rollers 34 rotatably mounted in fixed positions to the steady rest mount 29 of the steady rest 3 by means of roller support shafts 47. These individual rollers 34 support a support disk 6 which is again provided with a radially extending opening 25. The support disk 6 has a circumferential surface 32 resting against all the rollers 34. The rollers 34a and 34b are so spaced from each other that they accommodate the opening 25 for the insertion and removal of a work piece when the support disk 6 is in a tool exchange position.

Referring to FIG. 7, the roller shafts 47 are supported substantially rigidly in two annular plates 48, 49 and an axial displacement is prevented by two spring rings 47a and 47b. The annular plates 48 and 49 are mounted in the steady rest mount 29. The rollers 34, 34a, 34b, are supported by two so-called axial and radial bearings 50, which define the axial and radial position of the rollers 34. An axial displacement of the rollers 34 is prevented because the bearings 50 bear axially against the inner surfaces of the annular plates 48 and 49. Additional rings 51 and 52 make sure that the support disk 6 is restrained against axial excursions while permitting the rotation of the support disk 6.

Incidentally, the support disks 5 and 6 of the steady rests 2 and 3 respectively, are also equipped with the holding elements 7 and 8 and the respective mounting means for thees holding elements as described above with reference to the embodiment of FIG. 1. These holding elements 7 and 8 have not been shown in the support disks 5 and 6 for simplicity's sake.

Referring again to FIG. 1, a work piece such as the crankshaft 11 with its eccentric components 10 can be removed through the opening 25 after releasing the respective work piece mounting means not shown, but forming part of the lathe type machine tool. A radial pull is applied to the work piece, whereby the holding elements 7 and 8 are tilted about the respective axes 38, 38a against the force of the spring biased locking means 40 and 41. This resistance against the tilting of the holding elements 7 and 8 takes place only until the cams 56, 57 have passed the normal locking point. Thereafter, the rotational movement of the holding elements 7 and 8 necessary for the removal of a work piece, is even supported by the spring action of the locking elements 40, 41. After the work piece has been removed, the holding elements 7 and 8 actually remain in the "open" position. Thus, the locking means 40, 41 with their spring bias function in the manner of a toggle.

A new work piece 11 can now be inserted through the opening 25, whereby the holding elements 7 and 8 return into their positions shown in FIG. 1. During the return movement the cams 56, 57 again pass the locking point determined by the locking means 40, 41 which tend to lock the holding elements 7 and 8 in the closed position after that point has been passed.

The holding elements 7 and 8 can be replaced by other holding devices permitting the support disks 4, 5, or 6 to hold the work piece in place. In any event, it is necessary to satisfy the condition that the disk 4, 5, or 6 can rotate concentrically relative to the rotational axis of the turn broaching machine and that the device can hold an eccentric work piece or rather portions of the work piece that constitute eccentric components. Further, a radial holding must be assured, an axial holding is not necessary since the work piece is held in the mounting means of the machine tool.

One or several of the present steady rest mounting means may be constructed as a unit for insertion in a lathe type broaching tool of a conventional construction for extending the capability of such machine tools to broaching unbalanced work pieces, especially crankshafts. Where a plurality of such steady rest units are employed, they will be axially aligned relative to the rotational axis of the turn broaching machine tool. Thus, the length of a work piece and its stiffness against bending are now of little concern because the number of support units can be selected in accordance with the requirements of any particular work piece. Even the vibration sensitivities of work pieces are of little concern anymore where a machine tool is equipped as taught herein.

The support units of the invention will be incorporated in new or existing machine tools with due regard to the movement of the broaching tools so that the support unit or units does not hinder such tool movements. For this purpose the shape or configuration of the steady rest mount 27, 28, 29 will be adapted to the requirements of the particular machine tool.

Although the invention has been described with reference to specific example embodiments, it will be appreciated, that it is intended to cover all modifications and equivalents within the scope of the appended claims.

What we claim is:

1. A machine tool for turn broaching crankshafts having main bearing pins and crank pins having an unbalance, comprising crankshaft mounting means for mounting a crankshaft for rotation about an eccentric rotational axis defined by said crank pins thereby permitting said crankshaft to rotate in an eccentric manner relative to its normal rotational axis defined by said main bearing pins, means for rotating said crankshaft about said eccentric rotational axis, broaching tool means mounted for performing a broaching operation on said crankshaft, said crankshaft mounting means including at least one steady rest means (1) including rotatable crankshaft support means (4, 5, 6) for supporting said crankshaft when it is rotating in an eccentric manner, said rotatable crankshaft support means comprising holding elements (7, 8) for contacting eccentric crankshaft portions (10) and means (38, 38a) journalling said holding elements for changing the position of said holding elements (7, 8) when said rotatable crankshaft support means are rotating so that radially outwardly directed centrifugal forces contribute to a radially inwardly directed holding force component exerted by said holding elements, whereby centrifugal forces caused by said eccentric crankshaft portions are at least partially compensated by said radially inwardly directed force component.

2. The machine tool of claim 1, further comprising drive means for rotating said rotatable crankshaft support means.

3. The machine tool of claim 1, wherein said steady rest means comprise balancing means (24) as part of said rotatable crankshaft support means, said balancing means (24) compensating at least partially for said rotating in an eccentric manner.

4. The machine tool of claim 1, further comprising steady rest mounting means for crankshaft rotatably mounting and guiding said rotatable support means.

5. The machine tool of claim 6, wherein said steady rest mounting means and said rotatable crankshaft support means each have a radially extending opening reaching into a rotational axis zone for an insertion and removal of a work piece.

6. The machine tool of claim 6, further comprising rolling contact bodies operatively inserted between said steady rest mounting means and said rotatable crankshaft support means, said rolling contact bodies contacting a circumferential surface of said rotatable crankshaft support means.

7. The machine tool of claim 1, further comprising adjustment means for adjusting a position of said steady rest means in the direction of said rotational axis for adapting said steady rest means to crankshafts of different lengths.

8. The machine tool of claim 1, wherein said rolling contact means comprise a plurality of rolling contact bodies (33 or 34) distributed along an arc encircling said rotatable work piece support means for about 300°.

* * * * *

UNITED STATES PATENT AND TRADEMARK OFFICE
CERTIFICATE OF CORRECTION

PATENT NO. : 4,895,057

DATED : January 23, 1990

INVENTOR(S) : Garri Berstein, Hans W. Obrig, Helmut Wittkopp Hermann Wolters

It is certified that error appears in the above-identified patent and that said Letters Patent is hereby corrected as shown below:

Claim 4, line 2, delete "crankshaft";
line 3, after "rotatable" insert --crankshaft--.

Claim 5, line 1, replace "6" by --4--.
Claim 6, line 1, replace "6" by --4--.

Signed and Sealed this

Eighteenth Day of December, 1990

*Attest:*

HARRY F. MANBECK, JR.

*Attesting Officer*     *Commissioner of Patents and Trademarks*